Oct. 2, 1945.   H. KLAUCKE ET AL   2,385,923
CONVEYER CHAIN
Filed Oct. 23, 1941   2 Sheets-Sheet 1
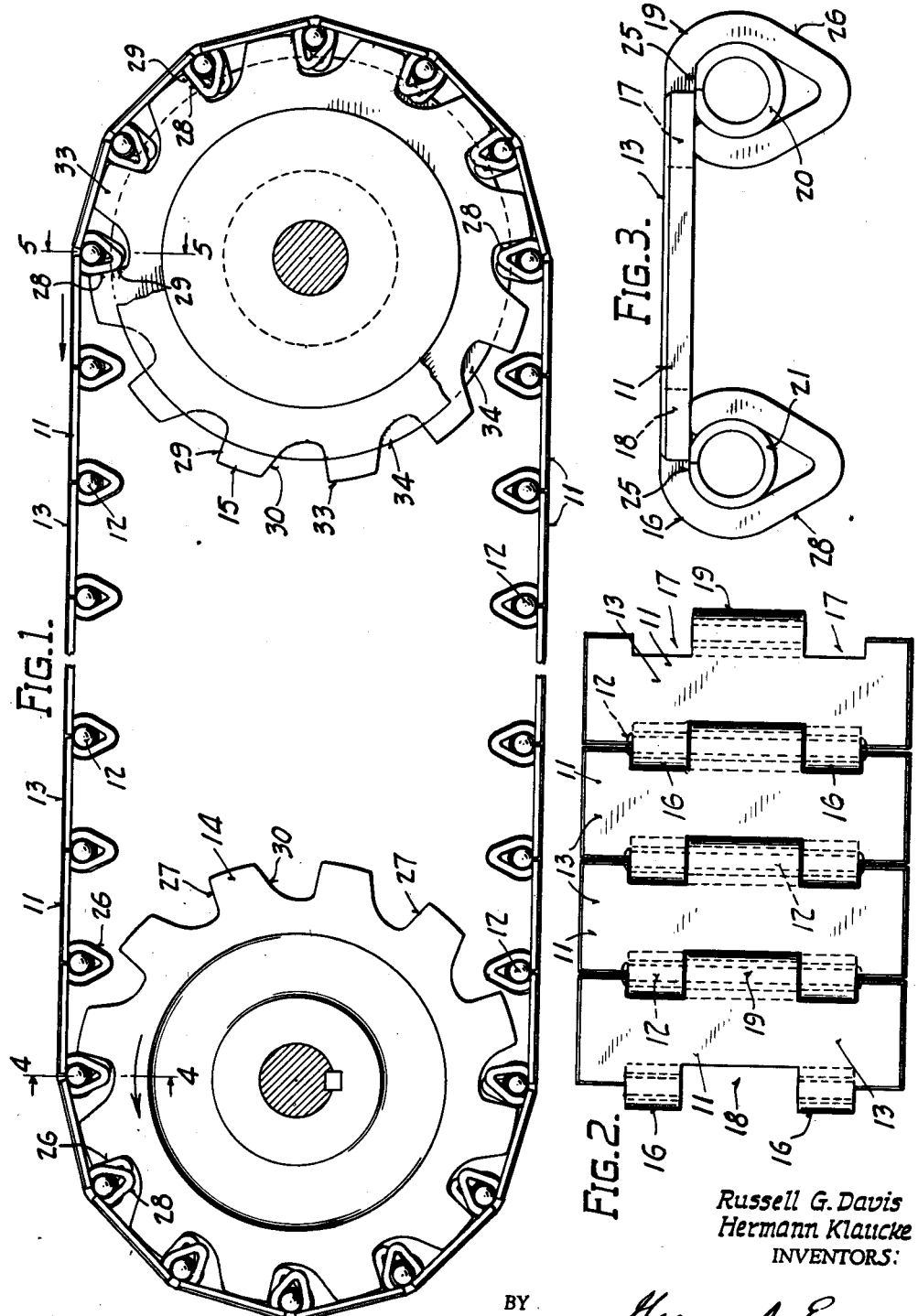
Russell G. Davis
Hermann Klaucke
INVENTORS:
BY George A. Evans
ATTORNEY.

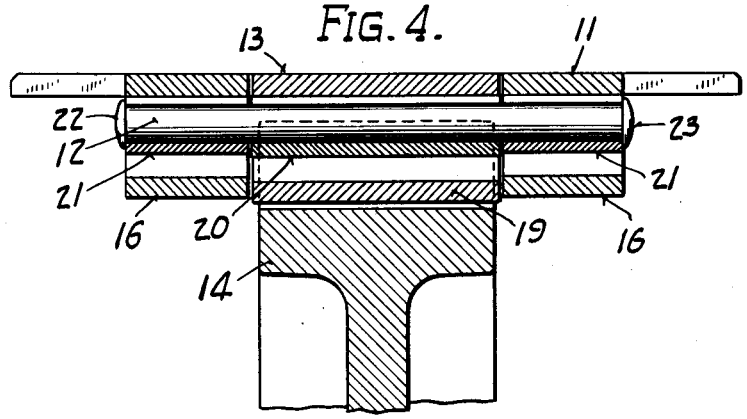
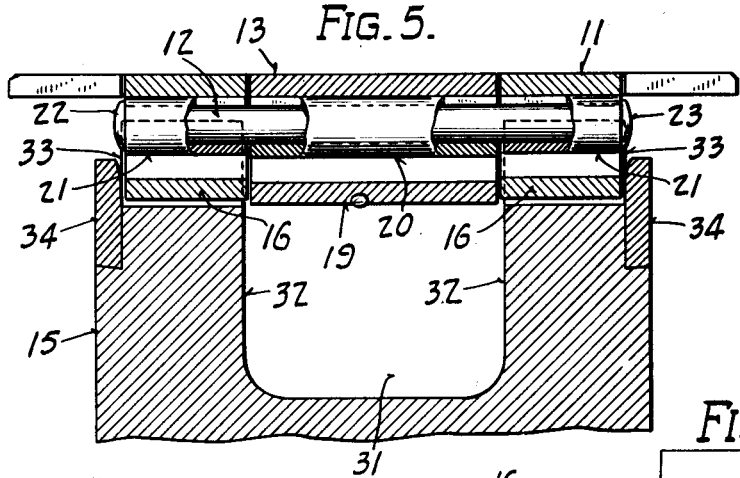
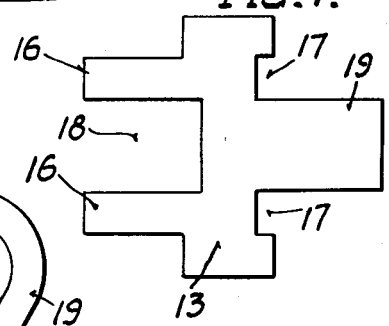
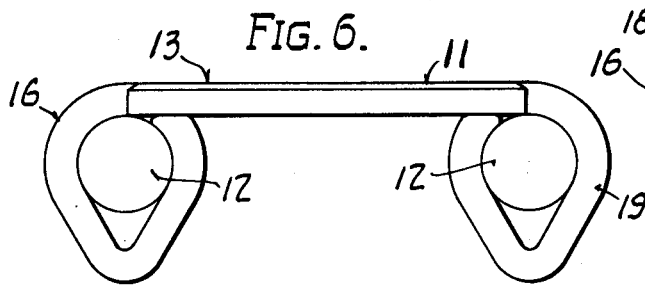
Russell G. Davis
Hermann Klaucke
INVENTORS:

Patented Oct. 2, 1945

2,385,923

UNITED STATES PATENT OFFICE 2,385,923

CONVEYER CHAIN

Hermann Klaucke, Worcester, Mass., and Russell G. Davis, Milwaukee, Wis., assignors to Chain Belt Company Milwaukee, Wis., a corporation of Wisconsin Application October 23, 1941, Serial No. 416,146

7 Claims. (Cl. 74—250)

This invention relates to a sprocket-type, conveyer chain and more especially to that character of conveyer chain for light duty, having a flat top surface for carrying articles. Such chain is extensively used in industries preparing food products for the market, where sanitary conditions should be maintained at a high standard. Illustrations of these industries are dairies, canneries, bottling plants, and meat packing establishments. The conveyer chains serve as the carrying media during the several operations of filling the cans or bottles, capping, pasteurizing, washing, sealing, labelling, etc.

It is the principal object of the present invention to provide a relatively simple but effective flat top chain conveyer for carrying articles such as food containers through the various stages in the processing operations heretofore mentioned, which chain will be simple to manufacture and assemble, of long operating life, and have frictional wear uniformly distributed between the several articulating parts.

These objects and others are accomplished in general by the provision of pintle-connected, flat-top, unitary chain links, preferably fabricated of plate material, the joined pintles having the aspects of pointed teeth, and presenting wide, flat, contacting faces to sprocket teeth, said links being so arranged as to permit coupling together of an odd or even number of links without the use of special offset links.

It is the further object of the invention to diminish wearing action between the sprocket teeth in the chain pintles by an arrangement of driving and driven sprockets for such chain conveyers, whereby the engagement of sprocket teeth and chain pintles is accomplished with no sliding or rubbing action to cause wearing of these parts, while allowing the chain to flex within its pintle members at all times.

The foregoing, as well as other and further objects, will be explained as the description proceeds. In its different aspects, the invention resides in the novel details of construction, combination and arrangements of parts more fully hereinafter described and pointed out in the appended claims.

Referring to the accompanying drawings, forming a part of the specifications, in which like members designate like parts in the several views:

Figure 1 is a fragmentary side view of a table top chain conveyer embodying the invention, certain parts are shown in section and others broken away.

Figure 2 is a top plan view of several connected table top chain links used in the conveyer.

Figure 3 is an enlarged side view of a chain link shown in Figure 2.

Figure 4 is a section through the driving sprocket taken on line 4—4 of Figure 1 looking in the direction of the arrows.

Figure 5 is a section through the driven or foot sprocket taken on line 5—5 of Figure 1 looking in the direction of the arrows.

Figure 6 is a side elevational view of a slightly modified form of chain link.

Figure 7 is a plan view, on a smaller scale, of a chain link blank, as stamped from the flat metal sheet.

In the drawings, the conveyer chain in Figure 1 is made up of a number of individual unitary chain links 11 which are assembled and retained by pins 12; and the flat upper surface 13 of the several connected links forms a level top surface for carrying articles in transit. These assembled links are driven by the driving or forward sprocket 14, the teeth of which contact the inner, long pintle of each link. At the opposite end of the conveyer a driven sprocket 15 is arranged to contact only the two outer pintles of each link, having its center portion recessed as shown in Figure 5. This arrangement of driving and driven sprockets permit hinging the chain in the link pintles with no rubbing or wearing action between the link pintle and the sprocket tooth.

Each link may be formed from a flat metal blank stamping (Figure 7) having a pair of extensions 16 at one end opposed by notches 17 of corresponding width and of sufficient depth to permit entry of the extensions 16 which are curled into the forward chain link pintles. Between the two extensions 16 the metal is notched out sufficiently at 18 to permit the extension 19 at the opposite end of a corresponding link, which is curled and forms the inner, long pintle previously mentioned. In this manner, the chain links may be coupled together and the connecting pin 12 inserted.

The extensions 16 and 19 are preferably curled over a forming mandrel into hingable, tooth-shaped, pintle members, the extension 19 forming a single long center pintle member which turns or articulates on the connecting pin 12, and extensions 16 form the two outer matching pintle members which are so arranged as to hold the pin 12 against turning. With the several links assembled, the top surface of each link is brought into close, contiguous and over-lapping relation, thereby providing on the upper run of the conveyer a smooth moving surface for transporting articles.

In the preferred form of the chain shown in Figure 3, the pintle members are bushed with removable wearing bushings. In this embodiment of the invention the inner pintle members may be formed on an arbor which is slightly wider than the arbor for forming the outer pintle members 16, which permits the use of a bushing 20 in member 19 of a slightly larger diameter than the bushings 21 in members 16, and thereby prevents end displacement of bushing 20 into either of the members 16 of the connecting link. Since the outer diameter of bushing 20 is larger than the opening in pintle 16, any end displacement of bushing 20 will seat this bushing against the inner edge surface of pintle 16.

The bushings 20 and 21 may be made from solid tubing or curled from flat steel blanks. In either case that side of the bushing contacting the underside of the carrying top is flatted as at 25 so as to lock the bushing against turning movement in the pintle. The flatting of the bushings permits disposition of the hinge of the connecting pin 12 closer to the chain top, and this minimizes the gap opening between the links while the latter are passing around the sprockets. Since hinging action between the links always takes place between the bushing 20 and pin 12, bushing 20 may be of hardened steel to resist wear by the chain pin. The bushing 21, however, may well be of soft steel, which is press fitted into pintle members 16, the inner diameter of bushings 21 being slightly smaller than pin 12 to permit a drive fit with the pin 12 to lock the same against turning.

The connecting pins 12 are provided at one end with a low head 22. After the pin is inserted in the pintles, thus connecting the several links together, the shank end of the pin is headed over at 23 by a riveting or similar operation. The heads are necessarily low since they are close to the underside of the top of the links, but of sufficient size to retain the pintles of adjacent links in hinged relation. Despite the headed portions, it is a simple operation to shear a head by the use of drift and hammer should occasion require taking the chain apart.

The external contour of each pintle member 16 and 19 is of a substantially pointed, gear-tooth shape. The upper portion, which blends into the top, and that portion which contacts the underside of the top, is circular. Between the curved top and bottom portion of the pintles, there are flatted, straight faces. The outer face 26 of pintle 19 will make flat face contact with sprocket teeth 27 of the driving sprocket 14 and the outer face 28 on pintle 16 will make flat face contact with sprocket teeth 29 on the driven sprocket 15. In this manner, that is, by providing flat face contact between the sprocket teeth and the chain pintles, a larger surface contact is secured than is possible with arcuate pintles.

The purpose and manner in which the chain is put to use permits operation universally in a forward direction and the teeth on sprockets 14 and 15 have forward flat faces 27 and 29 respectively for contacting the pintles while the contour of the rear faces 30 is sloped and curves into faces 27 and 29 of the succeeding teeth, ample clearance being provided between the teeth for chain articulation. This tooth form lends itself to a simple forming operation by using a milling cutter shaped to the forward and rearward face of the sprocket tooth. Furthermore, the same milling cutter may be used to cut the teeth on both the driving sprocket and driven sprocket, and also on sprockets of different number of teeth.

As shown in Figures 4 and 5, the driving sprocket 14 is of sufficient width to extend across the inner pintle member 19 of the chain link, whereas driven sprocket 15 contacts only outer pintles 16. Accordingly, sprocket 15 has a recess 31 between the side walls 32, thereby forming, in effect, a double sprocket which has teeth 33 of sufficient width to contact the outer pintle member 16 only, each set of teeth being spaced apart to clear the inner pintle member 19. In this manner, pintle members 19 contact the driving sprockets 14 and members 16 contact only the driven sprocket 15, thereby minimizing wearing action between the chain links and sprockets. Guide flanges 34 which keep the chain in alignment and prevent lateral displacement thereof, may be shrunk or otherwise attached to driven sprocket 15.

In the modified form of invention shown in Figure 6, bushings are eliminated from the pintles and pins 12 have bearing directly upon the pintles 16 and 19 of the chain links. In this modified form, the shape of pintles are substantially as shown in Figure 2, and in both forms, the pintles are unitary gear shaped with flat surfaces which make substantially radial contact with the sprocket teeth. With this chain the same sprockets may be employed as in the case of the chain illustrated in Figure 1 et seq.

While the driving sprocket 14 has been illustrated as being of substantially the same width (see Figure 4) as the male pintle 19, there is no danger of interference should a wider sprocket be employed, since the diameter of pintle 16, as previously described, is less than the diameter of pintle 19 to prevent the intermediate bushing from drifting endwise. This insures proper sprocket engagement with driven element of the chain.

Whether or not bushings be provided, the action of the chain in conjunction with the sprockets is similar. As illustrated, the driving sprocket 14 engages only the central or intermediate pintle of the links and the contact which is made is flat and for an extended length, thereby affording increased purchase between the links and the sprocket. Pressure exerted by the sprocket is transmitted through the pintle to the pin and hence to the links which are maintained under tension due to the load which they are pulling. At the driven sprocket 15, which is reversed on its shaft so as to enable the use of identically cut sprockets, pressure is transmitted through the outer or bifurcated pintles to the spaced apart teeth members, the intermediate pintle being clear of the sprocket. With the clearance afforded by the sprocket teeth gap, the chain pitch can elongate without placing the links under compression due to sprocket engagement.

One of the advantages of the present invention is that the chain may operate in either direction. Should it be desired to reverse the direction of travel, sprocket 15 will become the driver and its teeth will engage the outer pintles of the chain, while the long inner pintles 19 will engage the teeth of the driven sprocket.

Should wear at the pintle joints cause the links to elongate, proper sprocket action can still be maintained due to the unique sprocket tooth form employed. As pitch elongation occurs, the chain rides nearer the points of the teeth, but still operates on a pitch circle. Furthermore, the working load is distributed over all the teeth of the driving sprocket, thereby maintaining the chain under tension throughout the entire period of sprocket engagement. This is particularly valuable, since no tensioning device is necessary on the slack or return side of the chain to maintain the links, whether new or worn, from proper meshing engagement with the driving sprocket. Tensioning devices add considerably to the wear of both the chain and sprockets.

While two forms of the invention have been illustrated and described, it will be clear to those skilled in the art that the construction and arrangement of parts may be varied without departing from the spirit of the invention, and therefore it is not intended to limit the invention to any precise embodiment except as may be required by the respective claims.

The invention having been described, what is claimed is:

1. In a chain, the combination of links each having a curled portion at the ends, the curled portion at one end being bifurcated and the curled portion at the other end being arranged to extend intermediate of the bifurcated curled portion of the end of the adjacent link, whereby the links may be joined in hinged fashion, bushings retained within said curled portions, the bushings within the bifurcated curled portions being of smaller external diameter than the bushing retained within the intermediate curled portion, and pins extending through adjacent bushings and forming a hinged joint between the links.

2. In combination with a conveyer chain comprising a plurality of links each having a flat portion for conveying purposes, and hinged end portions, the hinged portion at one end being bifurcated and the hinged portion at the other end being arranged to extend intermediate of the bifurcated portion of the end of the adjacent link, pins connecting the hinges and forming a pintle joint, and sprockets for engaging said pintle portions, one sprocket engaging only the intermediate portion and another sprocket engaging only the outer portions of the pintle joint.

3. In combination with a conveyer chain comprising links connected by a hinged type pintle in which the outer pintles of one link straddle the inner pintle of an adjacent link, said pintles being shaped as teeth for extended linear sprocket engagement, a pair of sprockets having the same tooth shape, one sprocket having teeth arranged to engage only the outer pintles of the hinged joint and another sprocket having teeth arranged to engage only the inner pintle of the hinged joint.

4. In combination with a conveyer chain comprising links connected by hinged type pintles, said pintles being shaped as teeth for extended linear sprocket engagement, a driving sprocket comprised of teeth each having a forward, flat driving face and a sloping rearward face sufficient to accommodate spreading of the pintles, and a driven sprocket composed of teeth of the same contour as the teeth on the driving sprocket but with the flat portion of each tooth disposed rearwardly for driven engagement by the chain pintles.

5. In combination, a conveyer chain comprising links connected by hinged-type pintles, the pintle at one end of each link being disposed intermediate the pintles at the end of each adjacent link, a pair of sprockets having teeth arranged to mesh with said chain pintles in which only one side of each tooth is suitable for making contact with the chain pintles, said sprockets having the same tooth contour, the teeth of one sprocket being disposed for engagement with the intermediate pintles only, while the teeth of the other sprocket engage only the pintles at the opposite ends of the links from the intermediate pintles.

6. In combination an endless chain comprising links each having one end portion bifurcated and other end portion arranged to extend intermediate the bifurcated portion of the end of an adjacent link, pins connecting the links and forming pintle joints therewith, said pintles being tooth-like in external shape, and sprockets for engaging said pintles, each sprocket having teeth one face of which are disposed to mesh with said pintles and the other faces being sloping to afford clearance during spreading of the pintles, the teeth on one sprocket being arranged to engage only the bifurcated portions of the link pintles and the teeth on the other sprocket being of a width to engage only the pintles which extend intermediate the bifurcated pintles.

7. In combination with a sprocket having substantially flat chain contacting faces, a conveyer chain comprising a plurality of links, each link being formed from a single flat piece of metal and having a major flat portion adapted for conveying purposes with curled end portions, the curled portion at one end being bifurcated and the curled portion at the other end being arranged to extend between the bifurcated curled portion of an adjacent link, said curled portions being shaped as teeth extending at substantially right angles to said flat conveying portion, the outer sides of said curled tooth portions being substantially flat to afford extended contact with the driving faces of said sprocket teeth and allow for pitch elongation without crowding of the chain, and means connecting the curled portions of adjacent links.

HERMANN KLAUCKE.
RUSSELL G. DAVIS.